(No Model.)
G. H. REYNOLDS.
PISTON PACKING.
No. 499,471. Patented June 13, 1893.
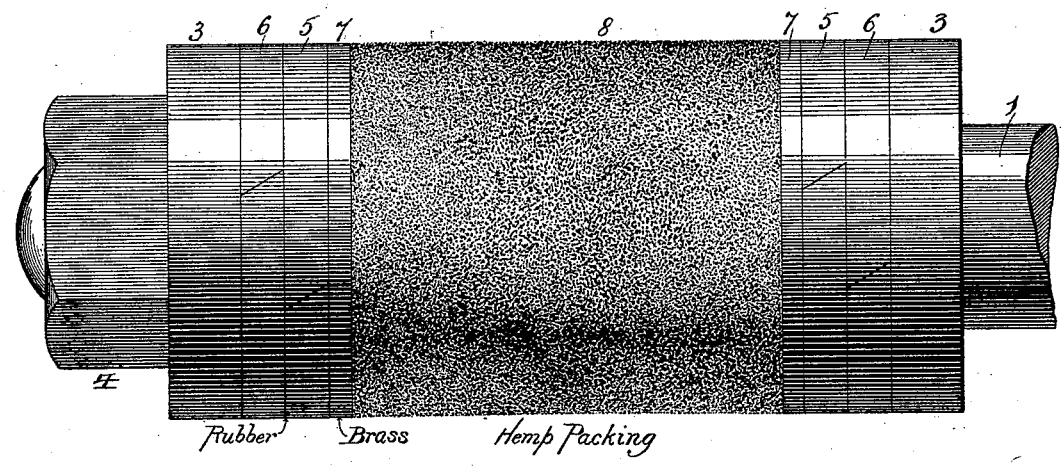
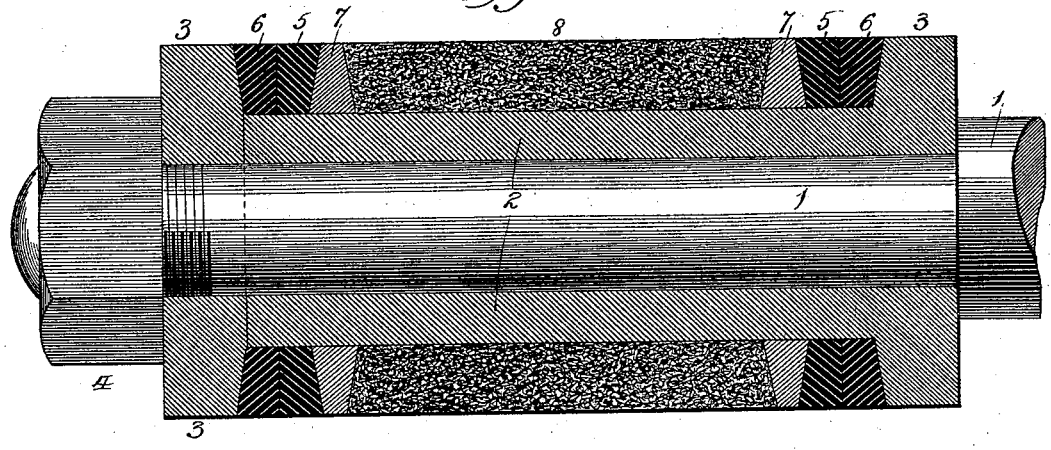

UNITED STATES PATENT OFFICE.

GEORGE H. REYNOLDS, OF NEW YORK, N. Y., ASSIGNOR, BY MESNE ASSIGNMENTS, TO THE NATIONAL COMPANY, OF ILLINOIS.

PISTON-PACKING.

SPECIFICATION forming part of Letters Patent No. 499,471, dated June 13, 1893.

Application filed August 6, 1892. Serial No. 442,339. (No model.)

*To all whom it may concern:*

Be it known that I, GEORGE H. REYNOLDS, a citizen of the United States, residing in New York, in the county and State of New York, have invented certain new and useful Improvements in Piston-Packings, of which the following is a specification, reference being had to the accompanying drawings.

My invention consists in so arranging the packing rings of a piston that they will be expanded laterally by the force which confines them longitudinally; also in interposing an elastic material, which may be a fibrous packing material, between said rings.

In the accompanying drawings which show one form of my invention, Figure 1 is an elevation and Fig. 2 is a longitudinal section.

In the figures, 1 is the rod, 2 the body of the piston, 3 the face flanges, and 4 the nut on the rod. The inner faces of the flanges 3 are beveled as shown.

5 and 6 are packing rings, split as usual as shown in Fig. 1, and having their adjacent faces plane to permit them to expand independently while still fitting together. I have shown these packing rings as made of hard rubber but they may be made of other suitable material.

7 are junk rings of brass or other material with beveled faces as shown. The rings 5 and 6 have their non adjacent faces beveled to fit the beveled faces of 3 and 7.

8 is an elastic medium confined under pressure between the rings 7. I prefer to use hemp packing or other fibrous material in this position but do not limit myself to it.

In use the packing rings 5 and 6 will be automatically expanded by reason of the beveled surfaces, and their tendency to expand will be continued by the force of the elastic material 8. If the latter be itself a fibrous packing material it will assist in making the piston tight.

I claim—

1. A piston packing composed of expansible packing rings having beveled faces in contact throughout their extent combined with an intermediate elastic material confined under pressure, substantially as set forth.

2. A piston packing composed of expansible rings having beveled faces, the junk rings also having beveled faces arranged by the side of the packing rings, and the elastic fibrous packing material confined under pressure between the junk rings, substantially as set forth.

3. The piston packing herein described consisting of the rubber rings 5 and 6 having beveled faces, the junk rings 7 and the intermediate fibrous packing material 8, substantially as set forth.

GEO. H. REYNOLDS.

Witnesses:
TODD MASON,
M. F. MASON.